3,093,485
SALAD DRESSING
Anthony Partyka, Chicago, Ill., assignor to National Dairy Products Corporation, New York, N.Y., a corporation of Delaware
No Drawing. Filed Apr. 11, 1960, Ser. No. 21,088
4 Claims. (Cl. 99—144)

The present invention relates generally to salad dressing and, more particularly, it relates to an emulsified salad dressing which is stable under freezing conditions.

There are various types of salad dressings and one well-known type is emulsified salad dressing. Such salad dressing generally comprises a mayonnaise which is mixed with a starch base. The mayonnaise comprises an edible, liquid oil with which is mixed vinegar and an emulsifying agent which is usually egg yolk. Suitable spices are added. The starch base comprises a starch, which may be treated to modify its characteristics in differing amounts and degrees, the starch being cooked with water to provide the base. As before indicated, the starch base is mixed with the mayonnaise to provide the emulsified salad dressing. The resulting product comprises from about 30 percent fat to about 50 percent fat. Under the Federal Standards as presently published, emulsified salad dressing must comprise at least 30 percent fat and at least 4 percent egg yolk (liquid basis). High quality salad dressing products on the market today comprise about 50 percent fat. However, certain low fat dressings, or so-called "diet dressings," are on the market today which contain substantially less than 30 percent fat and less than 4 percent egg yolk.

The fat in salad dressing is usually an edible liquid oil and may be soy bean oil, cottonseed oil or corn oil. It has been believed important that these oils be free from so-called "winterizable components." Such components will solidify under cold conditions, and have been believed to cause instability in salad dressing. As a result, in the case of cottonseed oil, the oil is subjected to "winterizing" conditions to remove these components from the oil. As indicated, the presence of these winterizable components within the oil has been believed to cause the breaking of the salad dressing emulsion so that the fat separates out from the aqueous phase, i.e., the water phase, in the salad dressing, leaving an unsatisfactory emulsified salad dressing product. This problem of oil separation is particularly noticeable when salad dressing is subjected to cold and freezing conditions. While winterizing of the oils and use of oils free from winterizable components has provided certain cold stability, there has not been provided a satisfactory emulsified salad dressing which could be subjected to freezing conditions without separation of the fat. Accordingly, emulsified salad dressings have not been capable of use in various frozen food products or on frozen sandwiches. Therefore, it has been difficult to manufacture frozen salad and other frozen food products with emulsified salad dressing.

It is, therefore, an object of this invention to provide a new salad dressing. A more particular object of the invention is to provide an improved emulsified salad dressing which is stable under freezing conditions. A still further object of the invention is to provide an emulsified salad dressing which can be used in various frozen foods such as salads and sandwiches. These and other objects and advantages of this invention are accomplished in accordance with the following disclosure.

Emulsified salad dressing, as above indicated, comprises a fat phase which is emulsified with an aqueous phase comprising vinegar and spices. While various emulsifying agents can be used in providing this emulsion, it has become more or less standard in the salad dressing industry to use egg yolk as the emulsifying agent. In this connection, such emulsifiers as lecithin, various gums, such as gum arabic, carob bean gum, and gum karaya, sodium carboxy methyl cellulose, and propylene glycol esters of alginic acid can be utilized for effecting the emulsion of the fat phase with the aqueous phase.

In the manufacture of emulsified salad dressing, the starch is cooked with water and is blended or mixed with a previously prepared mayonnaise emulsion. The preparation of the mayonnaise emulsion and the blending of the starch base is accomplished, in the industry, in various types of equipment. In this connection, a Hobart unit may be employed, as well as a blender, or other similar device.

In the manufacture of the emulsified salad dressing of this invention, any one of the usual liquid, edible, so-called soft oils, as for example cottonseed oil, corn oil and soy bean oil may be used. The cottonseed oil need not be winterized, as has been the practice heretofore. The oil which is used desirably has hard fat components in the oil and should cloud up in less than 5.5 hours in ice water (0° C.), in accordance with the cold test of the American Oil Chemists Society. In order to achieve this, hard fat may be added to the liquid oil, or, alternatively, the oil may be hydrogenated. In the preferred form of this invention, the presence of hard components in the oil will be reflected by a drop in iodine value of the oil which may be effected by hydrogenation of the oil or by addition of hardened fat to the oil.

The iodine value of the oil should be in excess of about 75. At lower iodine values, the oil becomes unduly viscous at ambient temperatures. Generally speaking, the product of this invention will have an iodine value of between about 90 and 115, in order to provide an emulsified salad dressing product which is not too stiff and which has substantial freeze stability. The iodine value may be somewhat higher with higher I.V. oils, or if presently used oils have higher I.V. values than are conventional. With hard fat components in the oil, in accordance with this invention, the salad dressing will have greater freeze stability at lower iodine values.

The oil will be present in the emulsified salad dressing in the range of from about 5 percent to about 60 percent. However, since present Federal Standards specify a fat level of at least 30 percent, in commercial practice, the salad dressing will comprise at least about 30 percent oil, except in the case of diet dressings. In order to provide the freeze stability, the oil will not be present in the salad dressing product at a level in excess of about 65 percent. At higher levels of oil, the emulsified salad dressing either separates upon freezing or, if hard oil components are present in amounts sufficient to prevent separation, the dressing loses its semi-solid character.

This invention contemplates the use of any emulsifying agent which is conventional in the manufacture of emulsified salad dressings. As has been previously pointed out, such emulsifying agent will usually be egg yolk. In accordance with the skill of this art, the egg yolk will be added in an amount which is sufficient to emulsify the oil with the aqueous phase of the salad dressing. It has been found that the egg yolk should be present in an amount of not less than about 8 percent of the soft oil (liquid yolk basis) to effect such emulsification. (Corresponding levels of other emulsifying agents can be readily determined within the skill of the art.) While somewhat higher amounts of yolk than above indicated facilitate the formation of the emulsion, it has been found that an excessive amount of egg yolk does not provide particularly improved freeze stability. It will be appreciated that oil which is set up at room temperature, such as margarine oil, comprises a substantial amount of soft oil.

It will be noted that the emulsifier level is related to the soft oil component of the fat. Such level would, therefore, be related to the soft oil in margarine oil.

It is well known in the art that various pieces of mechanical equipment effect tighter emulsions. However, the mechanical conditions of emulsification have not been found to provide any unusual advantages in respect of the freeze stability of the emulsified salad dressing. Therefore, the selection of the particular equipment is largely a matter of choice to provide a dressing body of desired characteristics.

It is particularly important that the starch which is used in the manufacture of the starch base, i.e., the cooked starch mixture, shall be a freeze resistant starch. Various starches of this character are known and are available from starch suppliers. It is necessary to utilize a starch or starches which will imbibe the water in the aqueous phase under the acid conditions of the product and retain it when subjected to freezing conditions. Accordingly, the starch which is used in the manufacture of the starch base should be capable of retaining the water in the system so that it does not crystallize out under the conditions of freezing to which the emulsified dressing will be subjected.

The blend of starches is adjusted to provide the desired texture to the product. Various starches which will provide such stability under freezing conditions are Amioca, modified waxy maize starches and modified tapioca starches and examples of such starches are sold under the tradenames Col-Flo 67 and Freezist.

The chemical composition and particular physical characteristics required in varying systems of the modified starches are not available generally. However, as indicated, the starches can be obtained by specifying the desired manner of utilization.

Starch blends may be utilized and it is not necessary that each starch ingredient in such a blend retain water under the freezing conditions, though the resulting gel should be freeze resistant. For example, corn starch may be blended with modified waxy maize starch and modified tapioca starch, which are freeze resistant, to provide a starch gel capable of retaining water under freezing conditions.

It is often desirable to blend the starches to provide the desired texture for the final salad dressing product. However, it is important that the blend provide a starch gel which is freeze resistant.

It has been found that it is possible to add oil to the system after the emulsified salad dressing is prepared. However, it has also been found that the end fat content of the product of the invention should not comprise fat outside the limits heretofore specified.

For purposes of testing the freeze stability of the emulsified salad dressing of this invention, the salad dressing is held at a temperature of at least minus 10° F. for a period of one week, and then warmed to room temperature. If the salad dressing, when warmed to room temperature, is separated, i.e., the oil separates from the emulsion, it is not considered freeze stable. On the other hand, if the salad dressing, when subjected to such freezing conditions, does not separate upon warming, it considered to be freeze stable. Many of the products of this invention can withstand considerably more stringent freezing conditions. However, the presently known salad dressings will not withstand the indicated freezing conditions.

A particular and unusual feature of the salad dressing of this invention is its inclusion of edible oil containing winterizable components. As above indicated, the presence of such components in the edible oil was considered to be wholly unsatisfactory in connection with the making of emulsified salad dressing. Accordingly, at substantial cost, cottonseed oil has been winterized to remove the winterizable components. At the same time, hardened components were not added to other oils, such as corn oil and soy bean oil when such oil was used in the manufacture of emulsified salad dressing. Accordingly, this invention represents a very substantial departure from the prior art and introduces a wholly new concept in the manufacture of emulsified type salad dressing.

*Example I*

As a particular example of this invention, a starch base was prepared in accordance with the following formula:

| | | |
|---|---|---|
| Water | liters | 4.26 |
| Vinegar (67 grain) | do | 2.35 |
| Sugar | kilograms | 1.37 |
| Salt | do | .15 |
| Spices | do | .067 |
| Starch, freeze resistant | do | .6 |

The freeze resistant starch comprised 2.5 parts of a modified waxy maize starch sold under the trade name Col-Flo No. 67, 3.0 parts of Amioca starch, and .5 part of modified tapioca starch sold under the trade name Freezist.

The foregoing mixture was heated up to a temperature of about 193° F. in about seven minutes and was then cooled to a temperature of about 145° F.

A mayonnaise was prepared in accordance with the following formula:

| | Pounds |
|---|---|
| Frozen salted egg yolk, comprising 10% salt | 1.9 |
| Water | .34 |
| Sugar | .15 |
| Spices | .0082 |
| Soy bean oil, 127 I.V | 6.82 |
| Vinegar (54 grain) | .734 |

The yolk, water, sugar and spices were mixed together in a Hobart mixer and, after being blended together, the soy bean oil was mixed in. Finally, the speed of the Hobart unit was reduced and the vinegar was added, whereupon the mayonnaise was passed through a Charlotte mill, which is a well known mechanical unit, to emulsify the ingredients.

15.4 pounds of the starch base was blended with 5 pounds of the mayonnaise in the Hobart mixer and a temperature of 105° F. was established. To this mixture was added 3.6 pounds of a blend of hydrogenated soy bean oil and hydrogenated cottonseed oil, the blend having an iodine value of 82. The hardened oil was melted and had a temperature of about 105° F. After the hardened oil and salad dressing were mixed together, the product was cooled down.

The resulting product had a fat content of about 30 percent and the fat in the salad dressing had an iodine value of 105. The yolk (liquid basis) comprised about 3.7 percent of the salad dressing product of the invention and the ratio of yolk to fat in the product was about .123. However, the ratio of the yolk to the soft oil employed in making up the product was .246.

Th eproduct was subjected to stringent freezing conditions and, in this condition, it was frozen to minus 40° F. and thawed at room temperature. It was thereupon frozen to minus 40° F. for an additional two weeks and then thawed at room temperature. After this, the product was frozen to minus 40° F. for one week and again thawed at room temperature. The product when subjected to these freezing conditions, did not break down and the water and oil phase of the product did not separate.

*Example II*

As an additional example of the preparation of the salad dressing of this invention, the starch base described in the foregoing example was utilized.

In addition, a mayonnaise was prepared in accordance with the following formula:

| | Grams |
|---|---|
| Frozen salted egg yolk, comprising 10% salt | 253.5 |
| Water | 209 |
| Sugar | 77.2 |
| Spices | 4.2 |
| Blend of hydrogenated soy bean and hydrogenated cottonseed oil (82 I.V.) | 3520 |
| Vinegar (54 grain) | 369.9 |

The foregoing ingredients were blended together and emulsified in accordance with the procedure set forth in the foregoing example, except that the temperature of the mixture was maintained above the melting point of the fat.

3 pounds of the starch base was blended with 5.4 pounds of mayonnaise in the Hobart mixer, the mixture being maintained at a temperature of about 105° F. After blending, the product was cooled down.

The resulting product had a fat content of about 50 percent and the fat in the salad dressing had an iodine value of about 82. The yolk (liquid basis) comprised about 3.29 percent of the salad dressing and the ratio of yolk to fat in the salad dressing was about .065. However, the ratio of yolk to soft oil in the margarine oil was in excess of .08.

The product was subjected to a temperature of minus 40° F. for a period of one week and warmed to room temperature. There was no separation of the product and the oil did not come out of the emulsion. The product was quite freeze stable.

*Example III*

As another example of this invention, a starch base was prepared in accordance with the following formula:

| | | |
|---|---|---|
| Modified waxy maize starch, Col-Flo 67 | grams | 500 |
| Amioca starch | do | 300 |
| Salt | do | 160 |
| Spices | do | 70 |
| Sugar | do | 1589 |
| Water (140° F.) | cc | 4260 |
| Vinegar (90 grain) | cc | 1142 |
| Vinegar (45 grain) | cc | 1152 |

All of the foregoing ingredients were mixed together and cooked up to a temperature of about 195° F. with agitation and the mixture was then immediately cooled to 140° F.

A mayonnaise is prepared in accordance with the following formula:

| | Grams |
|---|---|
| Soy bean oil (127 I.V.) | 3100 |
| Egg yolk (48.3% solids) | 863 |
| Sugar | 68 |
| Salt | 26 |
| Water | 154 |
| Vinegar (54 grain) | 333 |
| Spices | 3.7 |

The egg yolk, spices, sugar, salt, and water are mixed together at low speed in a Hobart mixer for about 2 minutes. The soy bean oil is added at low speed and then the mixture is beaten for about 1 minute at low speed. The speed is reduced and the vinegar is added slowly and the mixture is beaten for about 30 seconds. The mixer is stopped, the mayonnaise scraped down and then again beaten at high speed for about 15 seconds. This scraping and beating is then repeated. After the mixing, the mayonnaise is run through a Charlotte mill.

The cooked starch base, at a temperature of about 140° F., and the mayonnaise, at a temperature of about 90° F., are mixed with a melted blend of hardened oils having an iodine value of about 82. In this connection, 15.4 pounds of starch base, 5.0 pounds of mayonnaise and 3.6 pounds of the blended margarine oil are utilized.

The product is subjected to a temperature of minus 40° F. for one week and warmed to room temperature. The product does not separate and there is no apparent free oil on the top of the product.

*Example IV*

As still another example of this invention, using unwinterized cottonseed oil, a starch base is prepared in accordance with the following formula:

| | | |
|---|---|---|
| Modified waxy maize starch, Col-Flo 67 | grams | 250 |
| Amioca starch | do | 300 |
| Modified tapioca starch, Freezist | do | 50 |
| Salt | do | 150 |
| Spices | do | 67 |
| Sugar | do | 1590 |
| Water | cc | 4260 |
| Vinegar (90 grain) | cc | 1142 |
| Vinegar (45 grain) | cc | 1210 |

All of the above ingredients are mixed together in a jacketed kettle and heated with agitation to a temperature of about 190° F. The mixture is then immediately cooled to 125° F.

Mayonnaise was prepared in accordance with the following formula:

| | Pounds |
|---|---|
| Unwinterized cottonseed oil having a cold test of less than .5 hour | 6.82 |
| Frozen yolks (solids content 48.3%) | 1.9 |
| Sugar | .15 |
| Salt | .058 |
| Spices | .0082 |
| Vinegar (54 grain) | .734 |

The mayonnaise was manufactured in accordance with the previous example.

In accordance with this invention, 4.2 pounds of the mayonnaise was mixed with 5.8 pounds of the starch base. In this connection, the mayonnaise and starch base were blended together in a Hobart mixer at low speed for one minute. The mixture was then further blended at a higher speed for one minute and finally mixed at a still higher speed for 30 seconds. The product was scraped down from the sides and the high speed beating was continued for an additional 30 seconds.

This product was subjected to a temperature of minus 40° F. for one week and warmed to room temperature. The product remained stable and there was no separation of oil from the product.

*Example V*

In accordance with this example, a starch base was prepared in accordance with the formula and procedure set forth in Example IV. A mayonnaise was also prepared in accordance with the formula and procedure set forth in Example III. .690 pound of the mayonnaise and 4.1 pounds of the starch base were mixed together at a medium speed for one minute in a Hobart mixer. The product was then scraped down from the side of the mixer and blended for 30 seconds at high speed.

The end product had a total fat content of about 10 percent and remained stable when subjected to minus 40° F. for one week and warming to room temperature.

As before indicated, an outstanding feature of this invention is the provision of an emulsified salad dressing product which is stable under freezing conditions. Such a product has not been provided heretofore and was discovered to be provided by the addition of substantial amounts of hard fat components in accordance with this invention. The presence of such components have been, heretofore, considered deleterious to the stability of emulsified salad dressing. Accordingly, this invention provides an outstanding advance in the salad dressing art, in accordance with teachings which have not been believed to be possible in the salad dressing art.

The various features of this invention which are believed to be new are set forth in the following claims.

What is claimed is:

1. An emulsified salad dressing which is stable against freezing conditions, comprising, in combination, an edible oil which includes soft oil and winterizable components, a freeze resistant starch in an amount sufficient to substantially imbibe all of the moisture present in the salad dressing and retain the water under freezing conditions, and an emulsifying agent in an amount equivalent to egg yolk at a level in excess of 8 percent of the soft oil in the edible oil, said edible oil comprising more than about 5 percent of the salad dressing and less than about 65 percent of the salad dressing, said edible oil having an iodine value of between about 75 and about 115, and the winterizable components in such edible oil being in an amount such that the oil clouds when held in an ice bath for 5.5 hours.

2. An emulsified salad dressing which is stable against freezing conditions, comprising, in combination, an edible oil which includes soft oil and winterizable components, a freeze resistant starch in an amount sufficient to substantially imbibe all of the moisture present in the salad dressing and retain the water under freezing conditions, egg yolk at an amount of greater than 8 percent of the soft oil in the dressing, said edible oil comprising more than about 5 percent of the salad dressing, and less than about 65 percent of the salad dressing, said edible oil having an iodine value of between about 75 and about 115, and the winterizable components in such edible oil being in an amount such that the oil clouds when held in an ice bath for 5.5 hours.

3. An emulsified salad dressing which is stable against freezing conditions, comprising, in combination, an edible oil containing winterizable components and having an iodine value of between about 75 and about 115, a freeze resistant starch in an amount sufficient to substantially imbibe all of the moisture present in the salad dressing and retain the water under freezing conditions, and an emulsifying agent in an amount sufficient to effect emulsification, said edible oil comprising more than about 5 percent of the salad dressing and less than about 65 percent of the salad dressing, and the winterizable components in such edible oil being in an amount such that the oil clouds when held in an ice bath for 5.5 hours.

4. An emulsified salad dressing which is stable against freezing conditions, comprising, in combination, an edible oil containing winterizable components and having an iodine value of between about 90 and about 115, a freeze resistant starch in an amount sufficient to substantially imbibe all of the moisture present in the salad dressing and retain the water under freezing conditions, and an emulsifying agent in an amount sufficient to effect emulsification, said edible oil comprising more than about 5 percent of the salad dressing and less than about 65 percent of the salad dressing, and the winterizable components in such edible oil being in an amount such that the oil clouds when held in an ice bath for 5.5 hours.

References Cited in the file of this patent

UNITED STATES PATENTS

| | | |
|---|---|---|
| 2,125,391 | Musher | Aug. 2, 1938 |
| 2,162,585 | Musher | June 13, 1939 |
| 2,338,083 | Buchanan et al. | Jan. 4, 1944 |
| 2,627,469 | Melnick et al. | Feb. 3, 1953 |
| 2,653,876 | Hanson et al. | Sept. 29, 1953 |

OTHER REFERENCES

"Industrial Oil and Fat Products," by Bailey, Interscience Publishers, Inc., New York, N.Y., 1945, p. 194.